April 1, 1969

R. G. SCHLAWIN 3,436,703

INTERNAL BUS CONNECTION FOR HIGH CURRENT Y-CONNECTED TRANSFORMERS AND THE LIKE

Filed Oct. 20, 1967

INVENTOR:
RALPH G. SCHLAWIN,
BY
ATTORNEY

INVENTOR:
RALPH G. SCHLAWIN,
BY J. Wesley Haulser
ATTORNEY

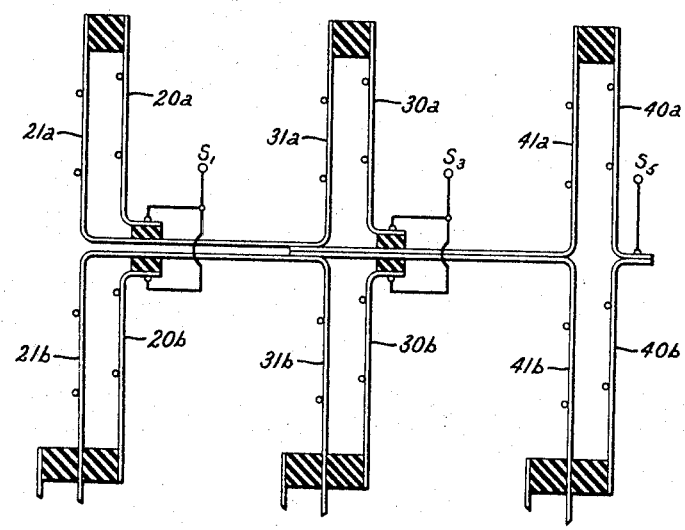
Fig. 4.
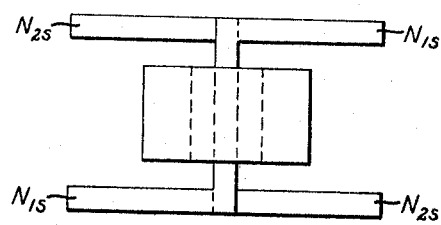
Fig. 5.
Fig. 6.
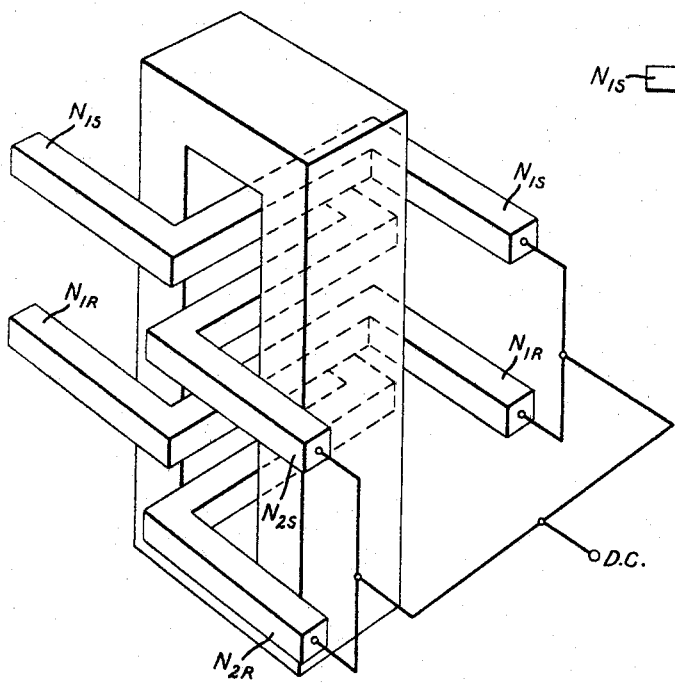
Fig. 6a.
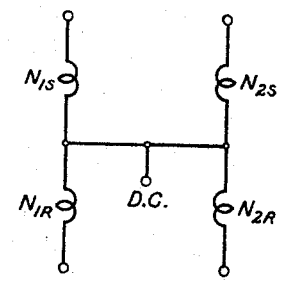

United States Patent Office 3,436,703
Patented Apr. 1, 1969

3,436,703
INTERNAL BUS CONNECTION FOR HIGH CURRENT Y-CONNECTED TRANSFORMERS AND THE LIKE
Ralph G. Schlawin, Pittsfield, Mass., assignor to General Electric Company, a corporation of New York
Filed Oct. 20, 1967, Ser. No. 676,865
Int. Cl. H01f 33/00
U.S. Cl. 336—12                7 Claims

ABSTRACT OF THE DISCLOSURE

An improved internal arrangement of bus conductors for Y-connected high current power transformers. Each phase winding is formed by connecting in parallel circuit relation some or all of a plurality of axially spaced-apart coils in a cylindrical winding assembly. Parallel connection is made through axially parallel bus conductors at one side of the winding assembly. The bus conductors adjacent each winding or section thereof are in two aligned pairs having abutting ends midway between the ends of the winding section. Adjacent ends of one aligned pair of buses are spaced apart and adjacent ends of the other are bent over and extended transversely of the winding axes in parallel engaging relation. The conductors of each spaced-apart pair are connected together and to one line terminal; all the transversely extending pairs lie in parallel engagement and pass between the spaced line voltage pairs to constitute an enfolded composite neutral bus. A plurality of such bus arrays, each forming a separate neutral, can be arranged at one or both sides of a coplanar group of cylindrical windings and inductively coupled through an interphase transformer.

---

My invention relates to electric induction apparatus such as power transformers and the like, and more particularly to internal coil connections for high current multiphase power transformers having a plurality of coils connected in parallel circuit relation to each phase winding terminal.

In Y-connected transformers designed for high current, low voltage operation such as rectifier transformers for electro-chemical process equipment, it has been the practice to form each phase winding by disposing a plurality of low voltage coils in axial spaced relation in a common cylindrical winding assembly and connecting these coils in parallel circuit relation through a pair of parallel bus conductors which extend axially along the winding for its full length. In a three-phase transformer built with its winding axes vertical such a collector bus results in the use of excessive copper at the low current end of the collector. Because of its location such a bus is not adapted for cooperation with phase terminal bushings mounted on the transformer sidewall. Since the terminal points of such collector buses are at the top of the transformer, it has been common to make complex bus interconnections and provide terminal bushings at the top of the transformer. This adds undesirable height to the transformer assembly, creates considerable eddy current loss and complicates the structure of interphase transformers. The complex bus work structures previously known also incorporate an undesirable amount of bus reactance.

Accordingly, it is a general object of my invention to provide an improved internal coil connection arrangement for Y-connected electric induction apparatus of the high current type.

It is a more particular object of my invention to provide, in Y-connected multiphase electric induction apparatus, an internal collector bus configuration for parallel-connected phase winding coils which is designed to reduce the size and weight of the bus connections.

It is still another object of my invention to provide in such Y-connected electric induction apparatus as power transformers and the like, an internal collector bus arrangement adapted to reduce bus reactance and minimize eddy current loss, as well as to simplify interphase transformer structure and facilitate side mounting of phase winding terminal bushings.

In carrying out my invention in one preferred embodiment, I employ a multiphase electric transformer or the like having a plurality of cylindrical winding assemblies in coplanar parallel spaced relation each of which comprises a plurality of separate coils in axial spaced relation. The coils in each winding assembly are connected in parallel circuit relation to constitute one phase winding, one end of each winding being connected to a common or neutral conductor which may or may not be brought out to a terminal. To effect such neutral and parallel coil connections, I provide adjacent each winding assembly or section thereof two parallel pairs of bus sections, the respective parallel pairs extending parallel to the winding axis and in mutual alignment from the center to opposite ends of the associated winding section. The separate coils in each half of the winding section are connected in parallel circuit relation to the juxtaposed parallel pair of bus sections. Grouped in aligned pairs, the bus sections of one such pair are spaced apart at their proximate ends and connected together outside the plane of the buses to constitute a line voltage bus. The bus sections of the other aligned pair are bent perpendicularly or folded into parallel-engaging relation and extended through the central space between the line voltage bus sections to constitute a neutral bus. Similar bus structures constructed in the same plane adjacent each of the other parallel and coplanar phase windings bring all the neutral buses out at one end of the transformer in substantial alignment in the plane of the buses and in parallel engaging relation. The proximate ends of each aligned pair of line voltage buses, being located adjacent the center of each associated winding section, are conveniently disposed for lateral connection to side-mounted line terminals.

My invention will be more fully understood and its various objects and advantages further appreciated by referring now to the following detailed specification taken in conjunction with the accompanying drawing in which:

FIG. 4 is a side-elevational view of a Y-connected bus structure similar to that shown at FIGS. 1, 2 and 3, but in which the neutral connection is not brought out to an external terminal;

FIGS. 5 and 6 are plan and perspective views, respectively, of an interphase transformer structure adapted to be simply and easily constructed utilizing the folded neutral buses shown at FIGS. 1, 2 and 3;

FIG. 6a is a schematic circuit diagram of the interphase transformer shown at FIGS. 5 and 6.

Figure 1:
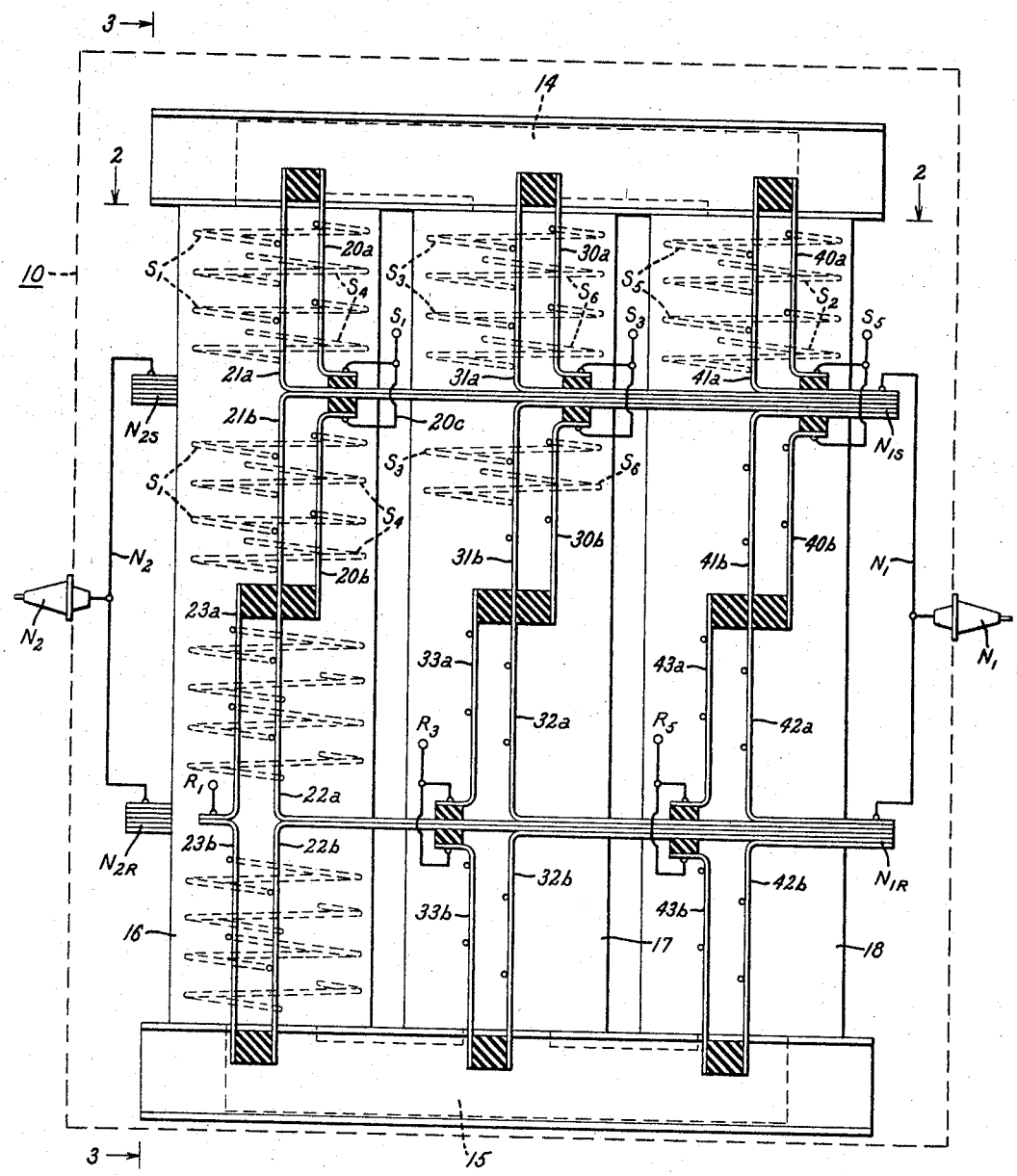
FIG. 1 is a side-elevational view of a three-phase Y-connected electric induction apparatus, the housing and current-conducting coils being shown in dotted lines to clarify disclosure of the internal bus structure.
Figure 2:
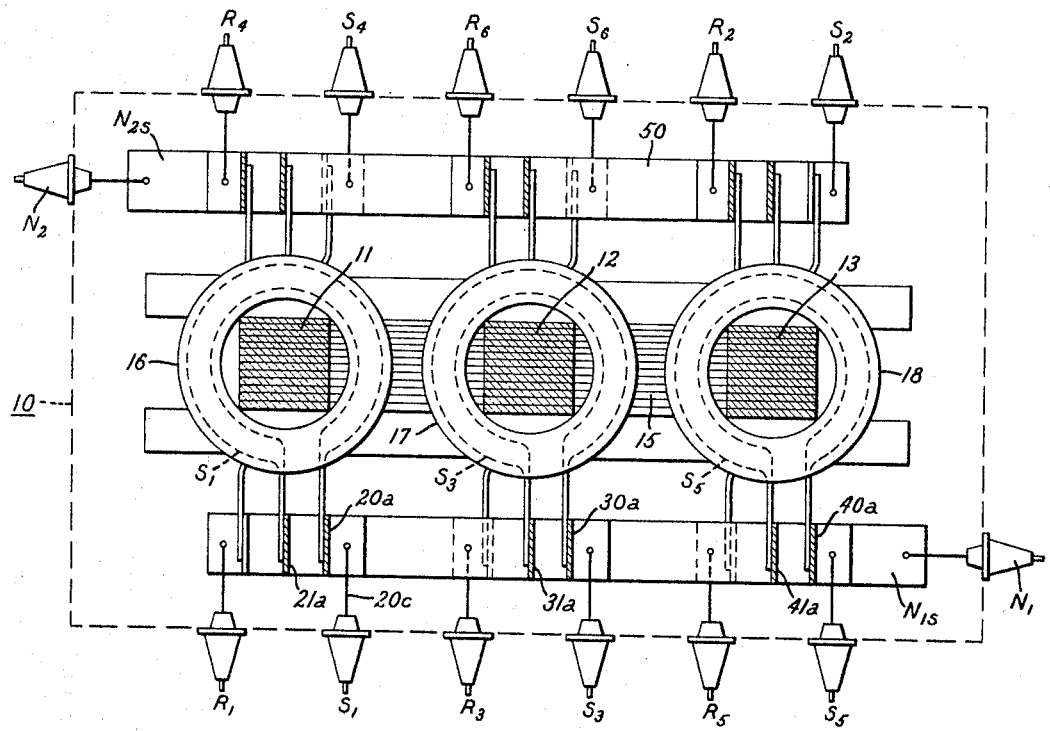
FIG. 2 is a horizontal cross-sectional view of the apparatus shown at FIG. 1 taken along the line 2—2 of FIG. 1.
Figure 3:
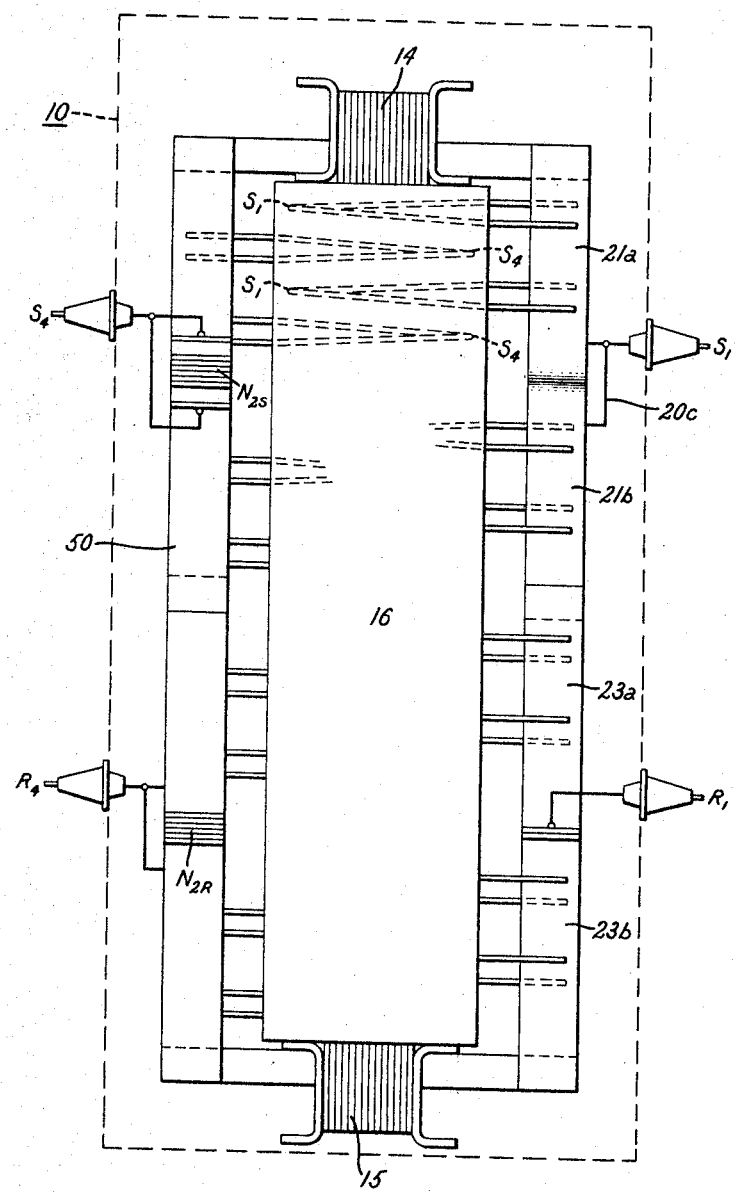
FIG. 3 is an end elevational view of the apparatus shown at FIG. 1 as indicated by the transverse plane 3—3 of FIG. 1.

Referring now to the drawings, I have shown at FIGS. 1, 2 and 3 a three-phase electric power transformer of the low secondary voltage type enclosed in a casing or housing 10 (shown in phantom outline only) and including three magnetizable core legs 11, 12 and 13 disposed vertically in coplanar parallel spaced relation. The core legs are bridged across their upper and lower ends by horizontal yoke members 14 and 15, respectively. Each core leg is provided with coaxial primary and secondary winding assemblies indicated generally at 16, 17 and 18. To clarify the illustrated interconnection of high current secondary windings, the separate coils of these windings are shown in phantom outline. It will of course be understood by those skilled in the art that in furnace-type transformers having low voltage, high current secondary windings as shown, the high voltage primary winding on each core leg ordinarily consists of a continuous helical winding in several layers immediately adjacent the core leg, the secondary winding coils surrounding the primary winding.

In the illustrated embodiment of the invention, each secondary phase winding assembly consists of a plurality of separate coils in axial spaced relation connected electrically in parallel through suitable adjacent bus conductors. The three primary windings (not shown) may be connected in either Y or delta circuit relation. As is common in rectifier supply circuits, the secondary windings are divided into a plurality of Y-connected groups adapted to be interconnected through one or more interphase transformers between the neutral points of the Ys.

Figure 1A:
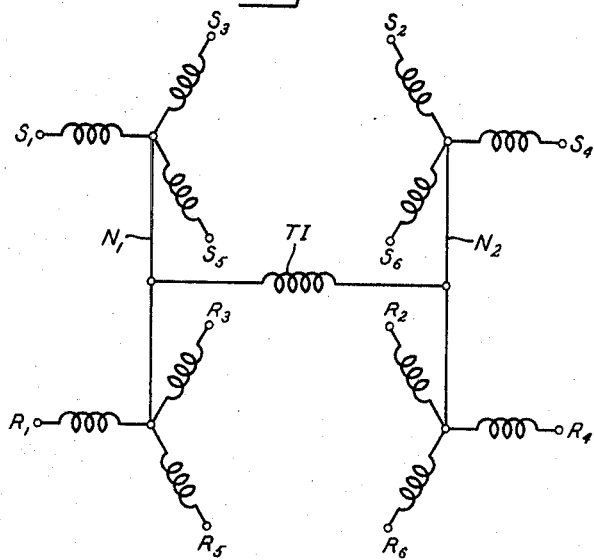
FIG. 1a is a schematic circuit diagram of the phase winding connections in the apparatus shown in FIG. 1.

The secondary windings shown at FIGS. 1, 2 and 3 are interconnected in four Y-connected three-phase groups in the manner shown schematically at FIGS. 1a. Each group consists of a phase winding from each of the winding assemblies 16, 17 and 18. As indicated at FIG. 1a, the individual phase windings are designated at their line terminals ends as $S_1$, $S_3$ and $S_5$ connected to a common neutral point as one Y-connected group; $S_2$, $S_4$ and $S_6$ Y-connected together as a second group; $R_1$, $R_3$ and $R_5$ Y-connected together as a third group; and $R_2$, $R_4$ and $R_6$ Y-connected together as a fourth group. The neutral point of the winding group $S_1$, $S_3$, $S_5$ is connected through a neutral conductor $N_1$ to the neutral point of the Y-connected group $R_1$, $R_3$, $R_5$. Similarly the neutral point of the Y-connected group $S_2$, $S_4$, $S_6$ is connected through a conductor $N_2$ to the neutral point of the Y-connected group $R_2$, $R_4$, $R_6$. The neutral conductors $N_1$ and $N_2$ are interconnected through an interphase transformer TI.

As will appear more fully hereinafter, the Y-connected phase windings $R_1$, $R_3$, $R_5$, $S_1$, $S_3$, $S_5$ are interconnected through bus conductors in a single plane at one side of the transformer core, and the phase windings $R_2$, $R_4$, $R_6$, $S_2$, $S_4$, $S_6$ are interconnected through a planar bus conductor array at the opposite side of the transformer core. The same reference designations shown at FIG. 1a for each phase winding (including both coils and related line terminal) are used also to identify like parts at FIGS. 1, 2 and 3.

Referring now again to FIGS. 1, 2 and 3, I have shown for the purpose of illustration sixteen individual secondary winding coils (in phantom display) in each phase winding assembly, eight coils being disposed on the upper half (i.e., section) of each winding assembly and eight coils on the lower half (i.e., section). The phase windings $S_1$, $S_3$ and $S_5$ are formed by parallel connection of alternate coils (also designated $S_1$, $S_3$, $S_5$) in the upper halves of the three winding assemblies 16, 17 and 18, respectively, and the phase windings $S_2$, $S_4$ and $S_6$ are formed by parallel connection of the intermediate coils (also designated $S_2$, $S_4$, $S_6$) on the same upper winding sections. Similarly the phase windings $R_1$, $R_3$ and $R_5$ are formed by parallel connection of alternate coils in the lower winding assembly sections, and the phase windings $R_2$, $R_4$ and $R_6$ are formed by parallel connection of the intermediate coils in the lower winding assembly sections.

This will be evident by referring now more particularly to the upper winding sections as shown at FIG. 1.

At FIG. 1 each coil is designated by the symbol of the phase winding of which it forms a parallel part. For example, the upper section of winding assembly 16 includes with four "$S_1$" coils alternately interspaced with four "$S_4$" coils. Similarly coils for windings $S_3$ and $S_6$ are disposed in like manner in the upper section of the intermediate winding assembly 17, and coils for phase windings $S_2$ and $S_5$ are disposed in like manner on the upper section of winding assembly 18. Correspondingly, coils for phase windings $R_1$ and $R_4$ are disposed in the lower section of winding assembly 16, and the phase winding coils (not shown) $R_3$, $R_6$ and $R_2$, $R_5$ are disposed, respectively, on the lower sections of winding assemblies 17 and 18.

The individual secondary winding coils are connected in parallel circuit relation to form each phase winding indicated at FIG. 1a, and the phase windings are Y-connected together at their neutral ends by an improved internal collector bus configuration embodying my invention as illustrated at FIGS. 1, 2, 3 and 7. The neutral collector buses are in four groups corresponding to the four Y-connected groups of phase windings shown at FIG. 1a, two groups being disposed in a common plane on each side of the transformer.

Referring now to one of these four bus conductor arrays shown adjacent the upper core leg sections at the exposed side of the elevational view of FIG. 1, it will be observed that I have provided two aligned pairs of collector buses extending in parallel circuit relation in a common plane for substantially the full length of each upper winding section (i.e., upper half). The aligned pairs of buses adjacent one side of the upper section of winding assembly 16 are designated 20a, 20b, and 21a, 21b, respectively. Similar aligned pairs of sectional bus conductors associated with the upper section of winding assembly 17 are designated 30a, 30b, and 31a, 31b; corresponding pairs of buses associated with the upper section of winding assembly 18 being designated as 40a, 40b, and 41a, 41b. A similar array of six aligned pairs of collector buses is associated with the lower winding sections on the same side of the transformer and in the same common plane, two aligned pairs of conductors in parallel spaced relation being associated with the lower section of each winding assembly. These lower section pairs of bus conductors are designated 22a, 22b, and 23a, 23b associated with the lower section of winding assembly 16; 32a, 32b and 33a, 33b associated with the lower section of winding assembly 17; and 42a, 42b and 43a, 43b associated with the lower section of winding assembly 18.

Figure 7:
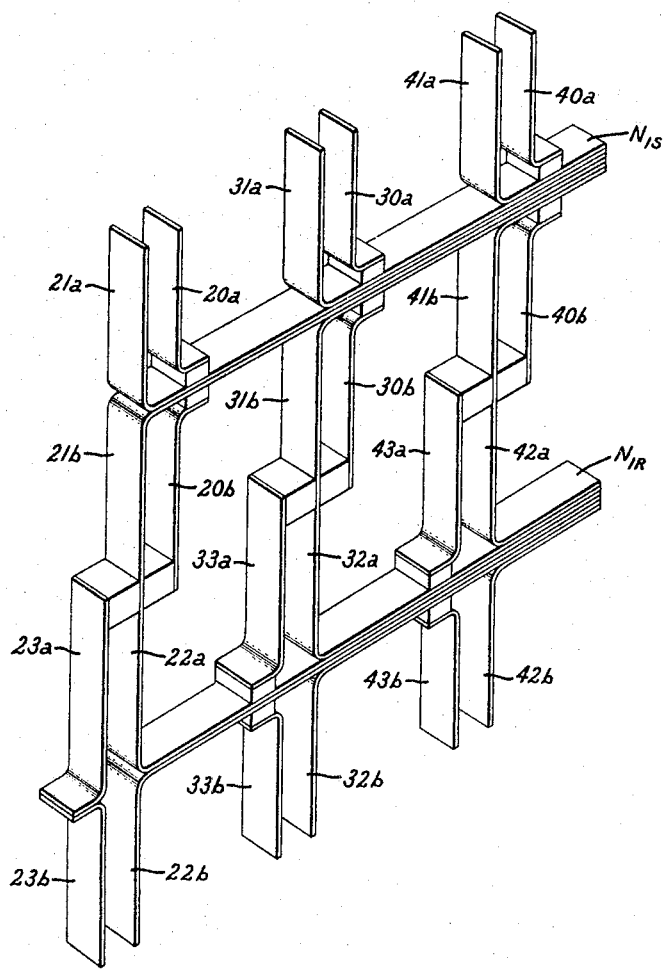
FIG. 7 is a perspective view of one of the several similar bus arrays shown at FIGS. 1, 2 and 3.

As shown at FIGS. 2, 3 and 7, all the vertically disposed aligned pairs of collector bus conductors referred to above are disposed in a common plane at one side of the transformer, the array being shown in perspective view at FIG. 7. It will be understood that a similar array of bus conductors is disposed in a second common plane at the opposite side of the transformer and designated generally by the reference numeral 50. (See FIGS. 2 and 3.)

The vertically disposed aligned pairs of collector bus conductors described above are utilized to connect in parallel circuit relation the several coils of each phase winding, to connect together the neutral points of each three-phase group of windings and to connect to a line voltage terminal for each phase winding. This will be evident from consideration of the drawings, referring particularly to FIG. 1. It will first be noted that the several coils of each phase winding are connected in parallel circuit relation between the two aligned pairs of collector buses extending along one side of the associated winding assembly section. For example, the alternate coils constituting the phase winding $S_1$ have their opposite ends connected respectively to the aligned bus pairs 20a, 20b and 21a, 21b. The intermediate coils S₄ in the same phase winding assembly are similarly connected in parallel circuit relation in the corresponding bus array 50 at the opposite side of the transformer. In like manner the phase winding coils S₃ are connected in parallel circuit relation between the aligned pairs of buses 30a, 30b and 31a, 31b, and coils S₆ are similarly connected to the opposite bus array 50. Finally, the phase winding coils S₂ are connected in parallel circuit relation through the pairs of buses 40a, 40b and 41a, 41b, the coils S₅ being connected in like manner in the opposite bus array 50.

The manner of connecting the parallel-coil phase windings thus described into Y-connected groups will now be described.

Referring again to the upper section array of bus conductors shown at FIG. 1, it will be observed that of the two aligned pairs of bus conductors adjacent the upper section of each winding assembly, one aligned pair is spaced apart at substantially the center of the core section. For example, the proximate ends of the conductors 20a, 20b are shown in such axial spaced relation. The parallel pair of aligned bus conductors associated with the same winding section, as the conductors 21a, 21b, are bent perpendicularly at their proximate ends, folded into lateral contacting engagement and extended through the space between the conductors 20a, 20b. The spaced-apart conductors 20a, 20b are connected, as by flexible conductors 20c (FIG. 1), to a line voltage terminal bushing designated S₁ at FIGS. 2 and 3. The angularly bent or enfolded bus conductors 21a, 21b constituting a neutral bus, extend transversely of the winding axes and centrally of the upper winding sections along the entire width of the transformer and through similar spaces between the high voltage collector buses 30a, 30b and 40a, 40b. The buses 30a, 30b are flexibly connected together outside the common plane and to a line voltage terminal bushing S₃ while the conductors 40a, 40b are similarly connected to a line voltage terminal bushing S₅. The aligned pair of conductors 31a, 31b are also bent perpendicularly and extend in lateral contacting engagement with the extended ends of neutral conductors 21a, 21b. Conductors 41a, 41b are similarly angularly bent and enfolded along the sides of the neutral conductor thereby to interconnect the winding S₁, S₃ and S₅ into one Y-connected group through a horizontal neutral conductor $N_{1S}$.

Similarly the lower half of the bus conductor array on the same side of the transformer connects appropriate coils in parallel circuit relation to form phase windings R₁, R₃ and R₅ and to connect these phase windings at a neutral conductor $N_{1R}$ are shown diagrammatically to be interconnected through a neutral conductor N₁ and through this conductor to an external neutral terminal bushing N₁ on an end wall of the transformer. (See FIGS. 1 and 2.)

It will be understood that the bus array 50 at the opposite side of the transformer interconnects appropriately disposed secondary coils in like manner to form the phase windings S₂, S₄, S₆ and R₂, R₄ and R₆, interconnecting the windings S₂, S₄ and S₆ into one Y-connected group through a neutral conductor $N_{2S}$, and the windings R₂, R₄ and R₆ into another Y-connected group through a neutral conductor $N_{2R}$. The conductors $N_{2S}$ and $N_{2R}$ are shown diagrammatically as interconnected and brought out externally of the transformer to a neutral bushing terminal N₂.

To illustrate more clearly the simple and symmetrical planar array of bus conductors, I have shown at FIG. 7 a perspective view of one planar array such as that shown at FIG. 1, the correspondence of parts in FIGS. 1 and 7 being demonstrated by a representative number of like reference numerals.

It may now be observed that each phase winding is made up of two groups of parallel connected coils, the coils of each group being connected in parallel circuit relation by a single pair of collector bus sections disposed in parallel spaced relation. The parallel bus conductors for each coil group are disposed with the respective neutral and line voltage conductors in alignment, the neutral conductors being folded over into lateral engagement and extended between the line voltage conductors. In this way each conductor need only be sufficiently large in cross section to collect the current from half the coils of any one phase winding, while the neutral conductor is made up of a plurality of successively converging pairs of aligned neutral buses. In the example described above, two Y-connected arrays of bus conductors are disposed on each side of the transformer. This provides two transversely disposed N₁ neutral buses at one side of the transformer and two transversely disposed N₂ neutral buses at the opposite side of the transformer.

Because of the foregoing disposition of neutral buses, it is especially convenient with my bus conductor array to form an interphase transformer. This may be done by offsetting each of the neutral conductors $N_{1S}$, $N_{1R}$ and $N_{2S}$, $N_{2R}$ through a single magnetic core loop, as shown at FIGS. 5 and 6, thereby to interpose a single electrical turn of the interphase transformer in each of the four neutral conductors. The neutral conductors may be interconnected on the outgoing side as indicated schematically at FIG. 6 to constitute a D.C. terminal for a rectifier circuit connected to the high voltage output terminals of the transformer. The interphase connection thus formed is shown schematically at FIG. 6a.

At FIG. 4, I have shown another embodiment of my invention similar to that described above but in which the neutral connection of a single Y-connected three-phase group of coils is made internally of the transformer and not brought out to a neutral terminal bushing. For simplicity of illustration a single Y-connected array of bus conductors is shown, corresponding, for example, to the upper section array illustrated on one side of the transformer at FIG. 1. For identification of parts, the same reference numerals have been applied to corresponding parts in FIGS. 1 and 7. It will be observed at FIG. 4 that the configuration of aligned pairs of buses forming high voltage and neutral bus sections is similar to that shown at FIG. 1 except that the transversely extending ends of the neutral bus pairs 21a, 21b and 31a, 31b extend in opposite directions toward each other, constituting in fact two pairs of end-to-end U-shaped bus conductors. The neutral pair of bus conductors 41a, 41b for the third phase is bent over to extend toward the center phase and into contracting engagement with the neutral conductors 21a, 21b, 31a, 31b. Thus all the neutral conductors at the internal neutral arrangement shown at FIG. 4 are bent or folded over perpendicularly at the midpoint of each phase winding section and extend transversely of the winding axes into parallel contact-making relation, but do not extend outwardly through one end of the array as at FIG. 1 to constitute an external neutral terminal.

While I have described certain preferred embodiments of my invention by way of illustration, many modifications will occur to those skilled in the art. For example, star (i.e., common neutral) connection of any desired number of phase windings may be made in like manner merely by adding more phase-related pairs of collector buses to enlarge the bus array laterally while enfolding all the neutral buses into mutual flatwise engagement. I therefore wish to have it understood that I intend in the appended claims to cover all such modifications as fall within the true spirit and scope of my invention.

What I claim as new and desire to secure by Letters Patent of the United States is:

1. In a multiphase electric induction apparatus including a group of cylindrical phase winding assemblies in coplanar parallel spaced relation, each said assembly comprising a plurality of separate coils in axial spaced relation, means for connecting at least a portion of the coils on at least a section of each winding assembly in parallel circuit relation to constitute a high current phase winding, said means comprising two aligned pairs of bus conductor sections extending alongside each said winding assembly section in a common plane and parallel to the winding axes, one aligned pair of said bus conductors adjacent each winding assembly section being axially spaced apart substantially centrally of the associated section and electrically connected together outside said common plane to constitute a line voltage terminal, all other aligned pairs of bus conductors having their proximate intermediate ends bent perpendicularly and extended transversely of said winding axes in substantial alignment in said common plane to form a composite neutral bus conductor disposed to pass between said aligned and spaced-apart pairs of line voltage bus conductors.

2. In a multiphase electric induction apparatus including three cylindrical phase winding assemblies in coplanar parallel spaced relation, each said assembly comprising a plurality of separate coils in axial spaced relation, means for connecting at least a portion of the coils on at least a section of each winding assembly in parallel circuit relation to constitute a high current phase winding, said means comprising two aligned pairs of bus conductor sections extending alongside each said winding assembly section in a common plane and parallel to the winding axes, one aligned pair of said bus conductors adjacent each winding assembly section being axially spaced apart substantially centrally of the associated section and electrically connected together outside said common plane to constitute a line voltage terminal, all other aligned pairs of bus conductors having their proximate intermediate ends bent perpendicularly and extended transversely of said winding axes in substantial alignment in said common plane and between spaced pairs of said line voltage bus conductors toward a common neutral terminal point at one side of said group of winding assemblies, the transversely extending ends from the most remote phase winding assembly being disposed in parallel engaging relation to form a neutral bus conductor and the transversely extending ends from all other phase winding assemblies successively overlying opposite sides of said neutral bus conductor in parallel engaging relation.

3. In a multiphase electric induction apparatus including three phase winding assemblies in coplanar parallel spaced relation, each said assembly comprising a plurality of separate coils in axial spaced relation, means for connecting at least a portion of the coils on at least a section of each said winding assembly in parallel circuit relation to constitute a high current phase winding, said means comprising two aligned pairs of bus conductor sections extending alongside each said winding assembly section in a common plane and parallel to the winding axes, one aligned pair of said bus conductors adjacent each winding assembly section being axially spaced apart substantially centrally of the associated section and electrically connected together outside said common plane to constitute a line voltage terminal, all other aligned pairs of bus conductors having their proximate intermediate ends bent perpendicularly and extending transversely of said winding axes in substantial alignment in said common plane, conductors of two of said pairs on adjacent winding assembly sections extending toward each other into contacting engagement and forming two transverse central buses in parallel spaced relation, transversely extending ends of the third bent pair of conductors extending toward and between said spaced central buses in contacting relation to constitute therewith a composite internal neutral bus.

4. A muliphase electric induction apparatus according to claim 1 wherein said coplanar winding assemblies are at least three in number and the neutral bus conductor portions adjacent the outer winding assemblies extend toward and engage the neutral bus conductor portions adjacent the central winding assembly, whereby said neutral bus conductor comprises only connections internally of said apparatus.

5. A multiphase electric induction apparatus according to claim 2 wherein alternate coils in said winding assembly sections are parallel connected in two discrete bus conductor arrays in separate planes, each said array including a neutral bus conductor, and interphase transformer means inductively coupling said neutral bus conductors.

6. A multiphase electric induction apparatus according to claim 5 wherein said interphase transformer means comprises a magnetic core and oppositely offset portions of said neutral bus conductors disposed in magnetizing relation therewith.

7. A multiphase electric induction apparatus according to claim 5 wherein two groups of three winding assembly sections are disposed in axial alignment and each provided with two discrete bus conductor arrays, alternate coils in said winding assembly sections being connected in two coplanar bus conductor arrays parallel to the plane of said winding assemblies at one side thereof and intermediate coils being connected to coplanar bus conductor arrays at the opposite side of the plane of said winding assemblies, each of said four bus conductor arrays forming a transversely extending composite neutral conductor, and interphase transformer means mutually inductively coupling said four neutral bus conductors.

References Cited

UNITED STATES PATENTS

| | | | |
|---|---|---|---|
| 2,403,072 | 7/1946 | Gates | 336—5 |
| 2,424,973 | 8/1947 | Edmonds | 336—5 |
| 3,008,079 | 11/1961 | Scott | 336—12 XR |
| 3,223,901 | 12/1965 | Riley | 321—8 XR |

LEWIS H. MYERS, *Primary Examiner.*

THOMAS J. KOZMA, *Assistant Examiner.*

U.S. Cl. X.R.

336—184